March 26, 1963 E. O. BLODGETT ETAL 3,082,687
CHARACTER WIRE PRINTER
Filed March 28, 1961 10 Sheets-Sheet 1
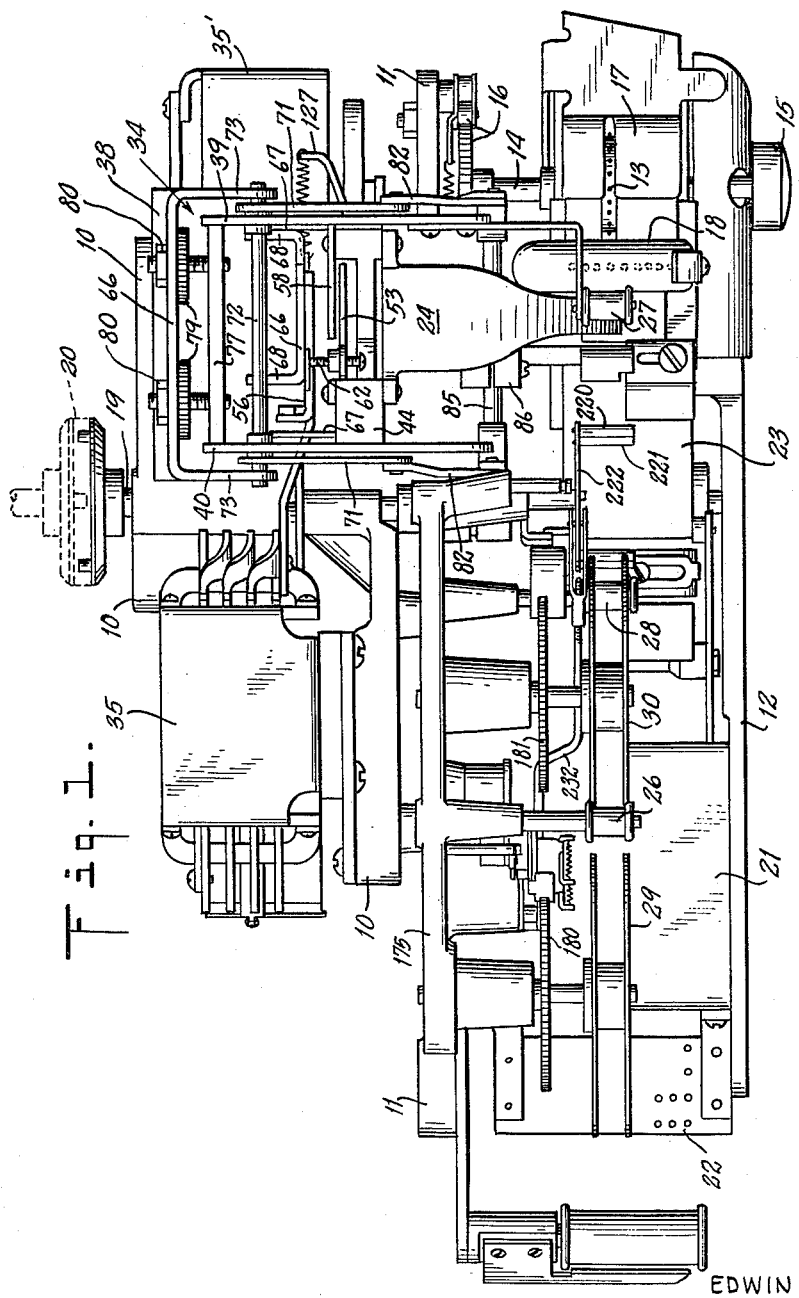
Fig. 1.
INVENTORS
EDWIN O. BLODGETT
HAROLD E. STIFFLER
BY
ATTORNEY

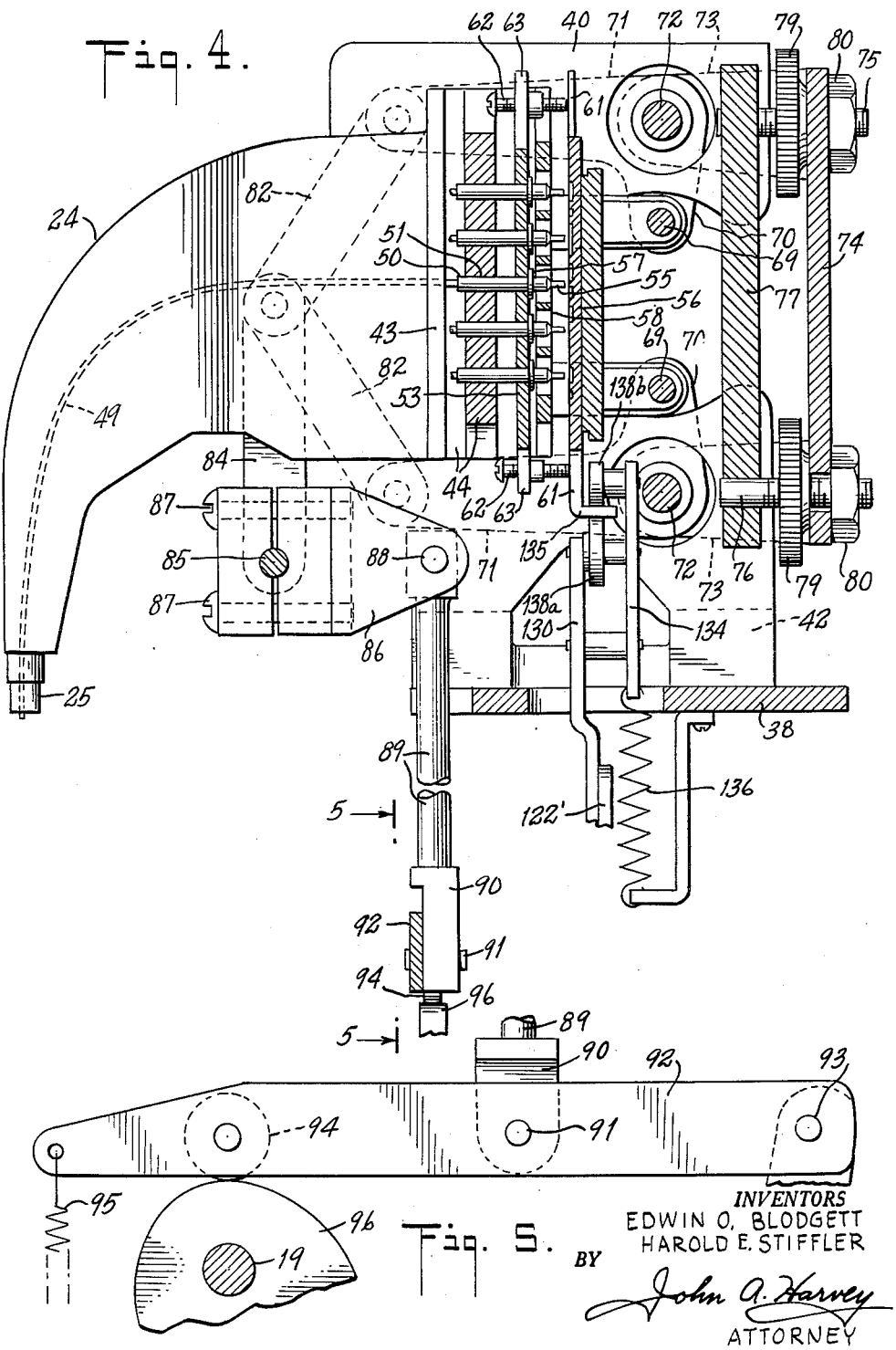

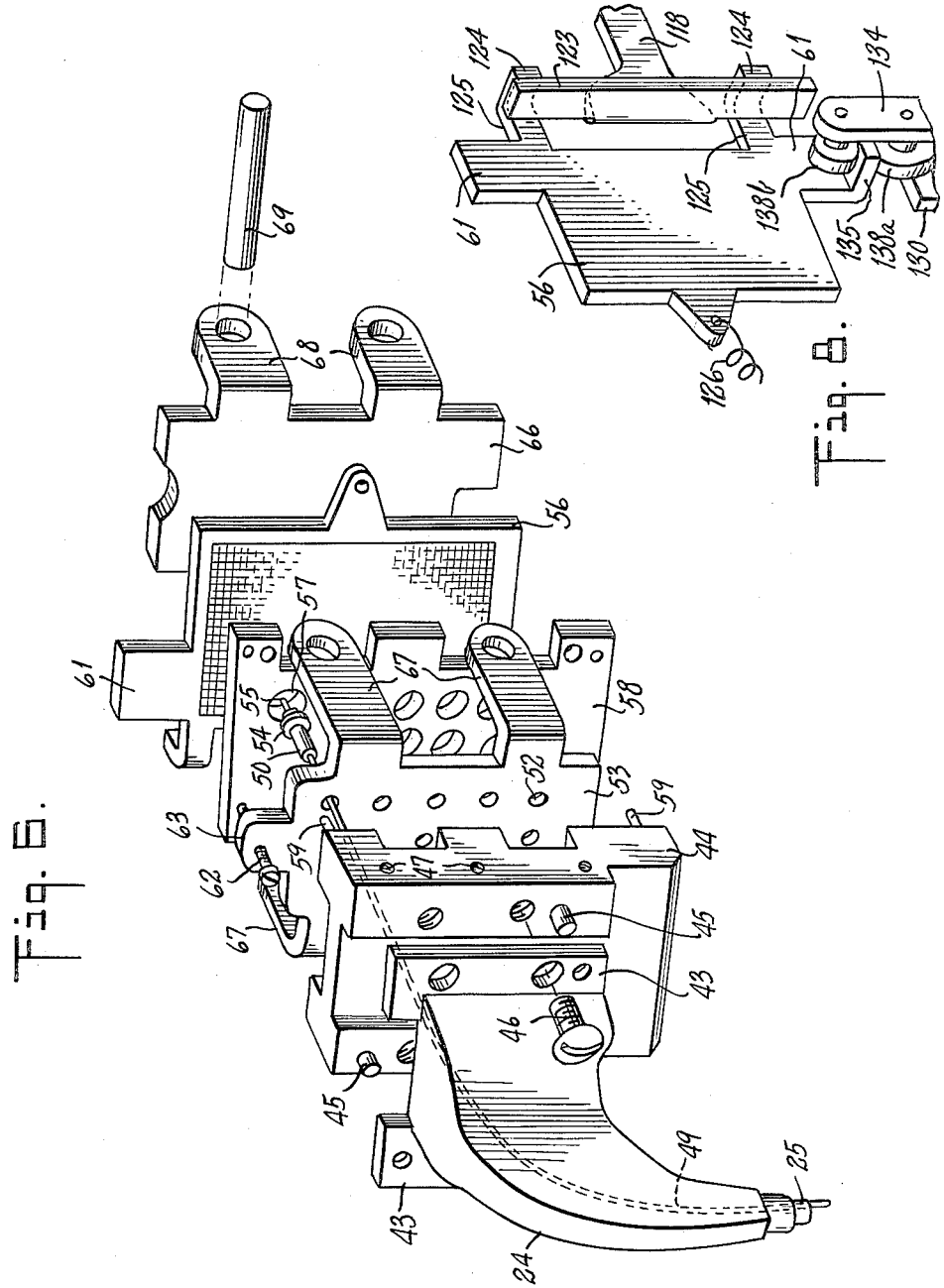

INVENTORS
EDWIN O. BLODGETT
HAROLD E. STIFFLER
BY John A. Harvey
ATTORNEY

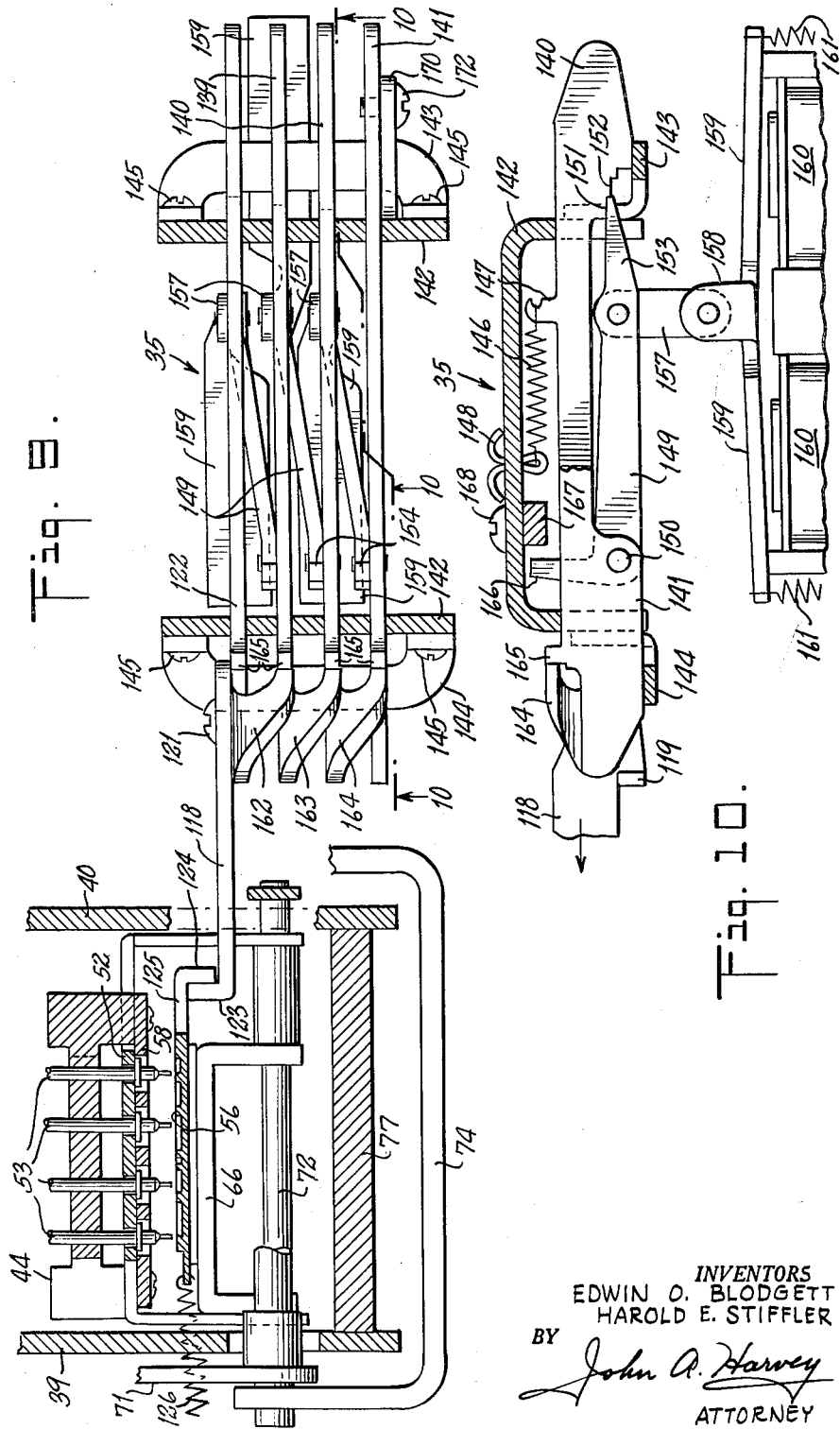

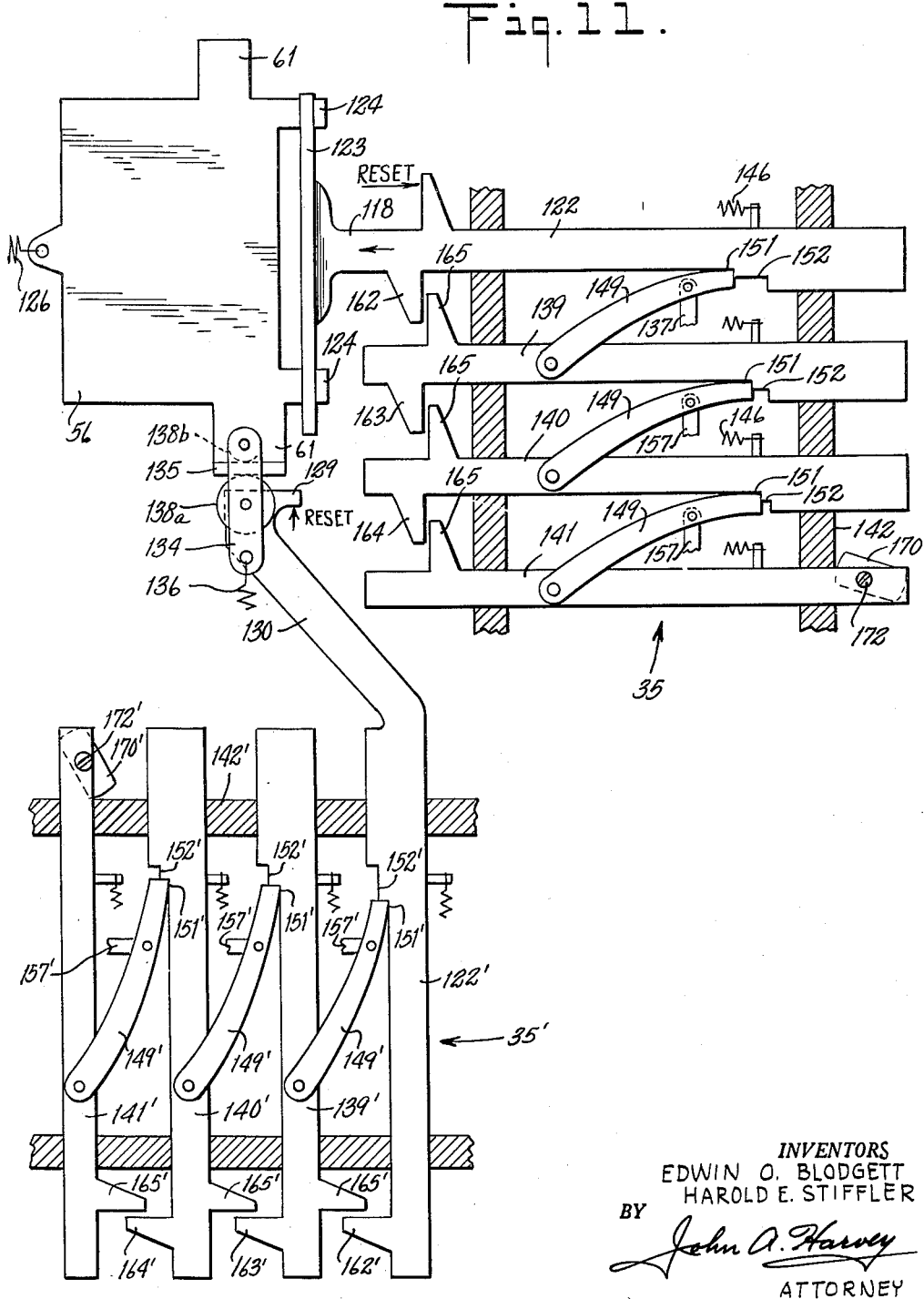

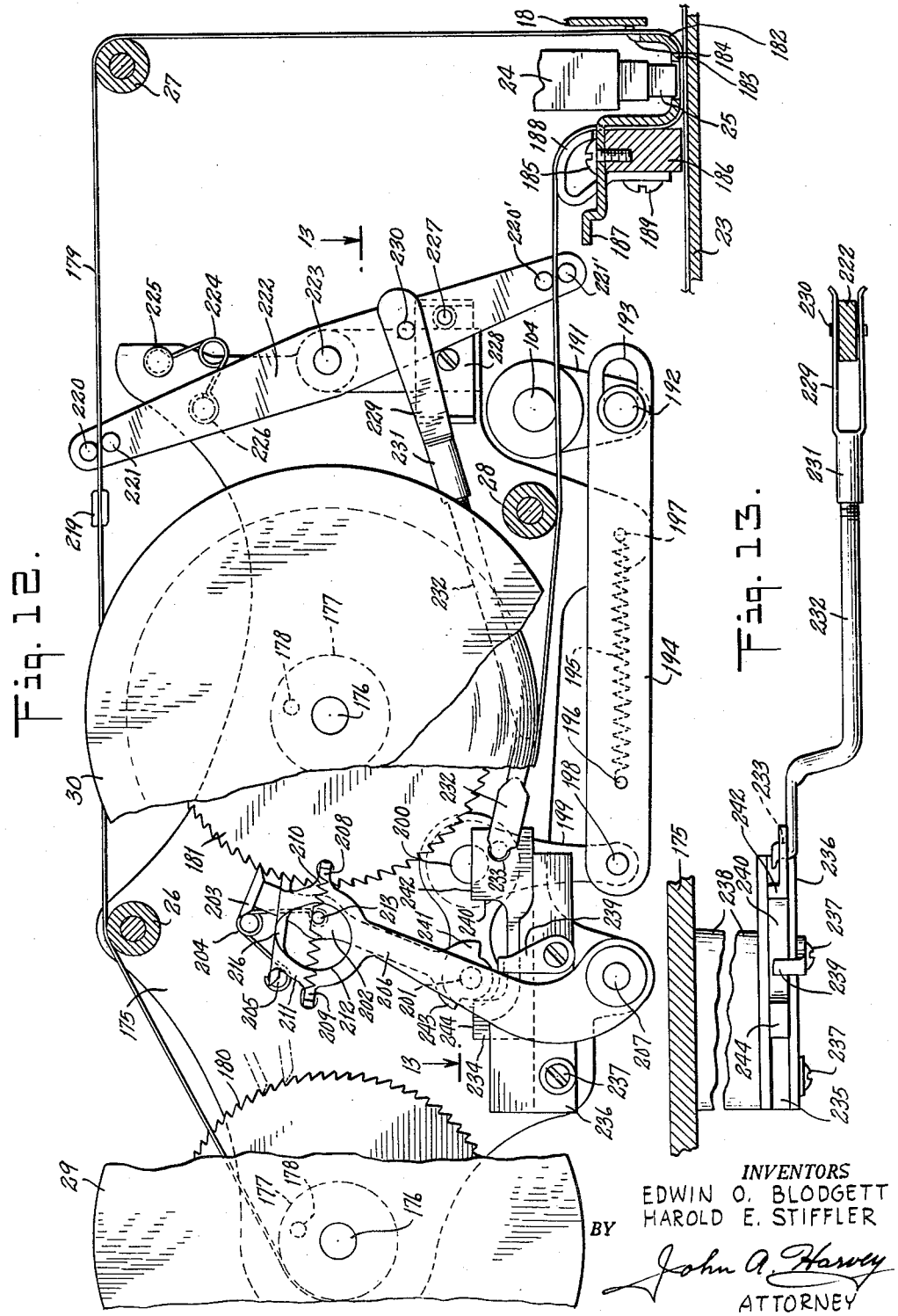

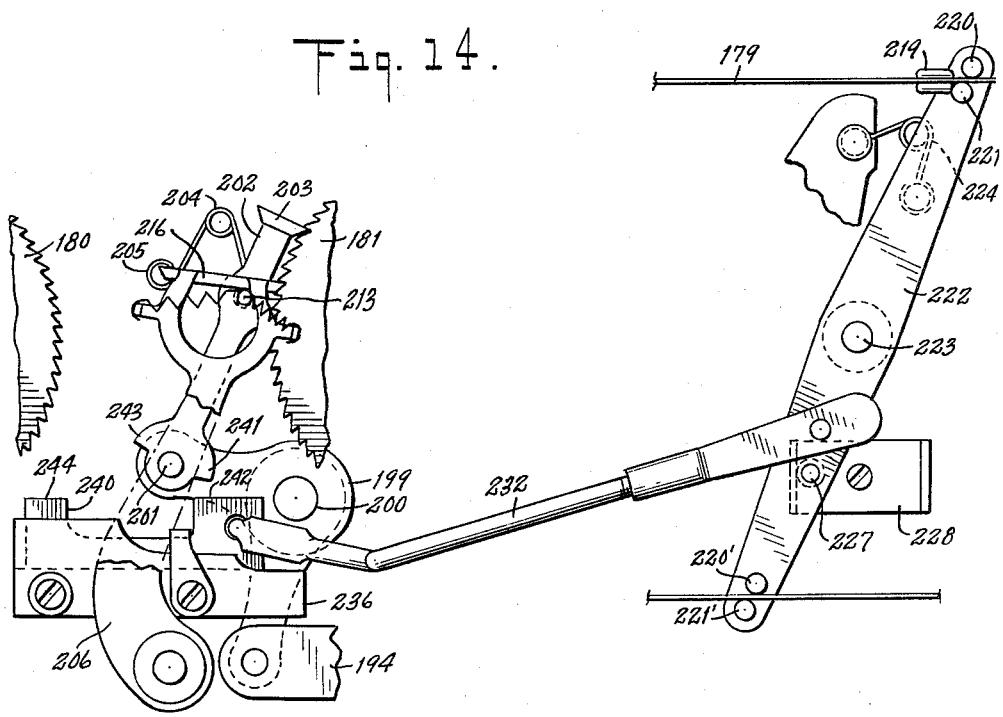
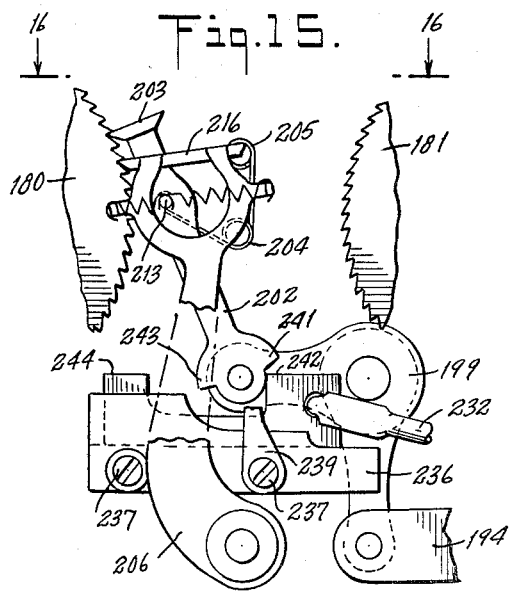
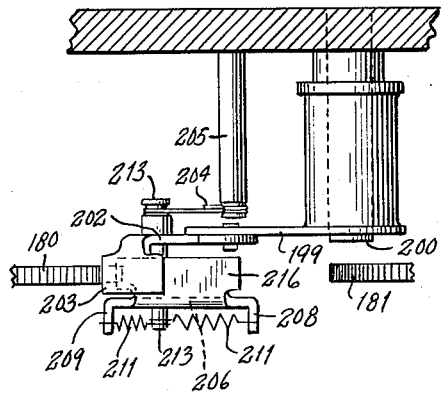

United States Patent Office 3,082,687
Patented Mar. 26, 1963

3,082,687
CHARACTER WIRE PRINTER
Edwin O. Blodgett, Rochester, and Harold F. Stiffler, Scottsville, N.Y., assignors to Commercial Controls Corporation, Rochester, N.Y., a corporation of Delaware
Filed Mar. 28, 1961, Ser. No. 98,963
18 Claims. (Cl. 101—93)

The present invention relates to character printers and, particularly, to printers of the type which print successive alpha-numeric characters and symbols. While the invention has utility in a wide and diverse range of printer structures, it has particular utility in wire printer structures and will be described in that connection.

Wire printers utilize a plurality of longitudinally movable print wires which are selectively engaged at one end by a character selection structure and converge at their other ends to a character-print cluster. One form of such printer has the character selection ends of the print wires terminating in a common plan, and utilizes a planar character selection code plate having discrete print-wire actuating areas allocated to each print wire. The code plate is positioned by plural incremental steps in each of two mutually perpendicular directions, and each of incremental segments of each of its discrete print-wire actuating areas is formed as an elevated plateau or depression depending upon whether the corresponding print wire is to be actuated to character-print position or is to be left in non-print position at each incremental step positioning of the code plate. Subsequent movement of the code plate toward the print wire ends effects longitudinal movement of selected print wires and thereby the printing of a selected alpha-numeric character or symbol.

The positioning of the code plate in the two mutually perpendicular directions as required to accomplish character-print selection has heretofore been accomplished by the use of selectively actuated interposers. A plurality of these interposers arranged in two groups control the code plate positioning in each direction, and each interposer has a body portion differing in width from that of other interposers in the group but has a narrower waste portion of uniform width. These groups of interposers are arranged with intervening rollers between fixed stops and code plate positioning linkage structures. The rollers permit ready longitudinal movement of each interposer from a non-actuated position where the adjacent rollers engage its waste portion to an actuated position where the adjacent rollers are wedged apart and engage the body portion of the interposer. Any such wedging apart of the interposer rollers of one group is transmitted through other interposers (in actuated or non-actuated positions) and intervening rollers and through the linkage structure to establish a character selection positioning of the code plate in one of its two directions. This positioning may be accompanied by a concurrent actuation of one or more interposers of the other group to effect further positioning of the code plate in the other of the two directions, thus to effect a composite character selection by one or more interposers of each group. The selected character is then printed by movement of the code plate into engagement with the ends of the print wires as earlier explained.

The controller positioning of the character selection code plate by the structure just described involves a rather complicated and relatively costly mechanical assembly utilizing many parts. The character selection operations may be more susceptible to possible error than is desirable by reason of the entrance of dust and dirt particles between the numerous surfaces which are necessarily in engagement in the structure and by reason also of the normal wear of these surfaces and of the contact surfaces and bearings of the mechanical linkages which connect the interposer groups to the code plate. Additionally, the numerous structural parts employed and their configurations and resultant individual and cumulative values of mass place a somewhat severe restriction on the rapidity with which character selection may be accomplished and undesirably limit the maximum rate of successive character printing.

It is an object of the present invention to provide a new and improved character printer which avoids one or more of the limitations and disadvantages of prior such printers.

It is a further object of the invention to provide a character printer capable of printing successive characters at a substantially higher printing rate than that heretofore readily attainable, and one wherein the mass and range of movement of all mechanical components of the printer are minimized to enhance the speed of printer operation yet without sacrifice of sturdiness of construction or operational reliability.

It is an additional object of the invention to provide a character printer of the wire printer type wherein the selection of alphanumeric characters and symbols for printing is under control of character-representative binary-form codes and is accomplished by a novel structure possessing a consistently reliable character of operation and one which enables the attainment of high printing rates free of operational error.

It is yet a further object of the invention to provide, in a character wire printer employing a conventional code plate for character selection, a novel code plate positioning structure characterized by unusually high precision and rapidity of operation yet one possessing a relatively simple, low cost and sturdy construction requiring minimized service maintenance and adjustment even over prolonged periods of severe service.

Other objects and advantages of the invention will appear as the detailed description thereof proceeds in the light of the drawings forming a part of this application and in which:

FIGS. 1, 2 and 3 respectively illustrate plan, end elevational and back elevational views of a character printer embodying the present invention in a particular form;

FIG. 4 illustrates, partly in cross-section a character wire printer structure employing a code plate for character selection, and FIG. 5 is a fragmentary view illustrating the manner of cam and cam follower actuation of the FIG. 4 printer in effecting the printing per se of each selected character;

FIG. 6 is an exploded view illustrating the assembly of the printing head of the FIG. 4 wire printer;

FIG. 8 is a fragmentary view illustrating more clearly the mechanical intercoupling used between the code plate and each of its positioning subassemblies;

FIGS. 9 and 10 illustrate, partly in cross-section, a representative one of the two code plate positioning subassemblies and the manner in which each such subassembly is selectively controlled by code energized latch control electromagnets;

FIG. 11 diagrammatically illustrates the manner in which the code plate positioning subassemblies effect code plate positioning in two directions, and is used as an aid in explaining this aspect of the operation of the character printer; and FIGS. 12–16 illustrate the construction of a print ribbon feed mechanism constructed as a unitary subassembly of the character printer and used to transport a printing ribbon past a print zone, the ribbon being engageable by the print ends of the print wires to impress a printed character upon a surface transported beneath the print zone.

Figure 2:
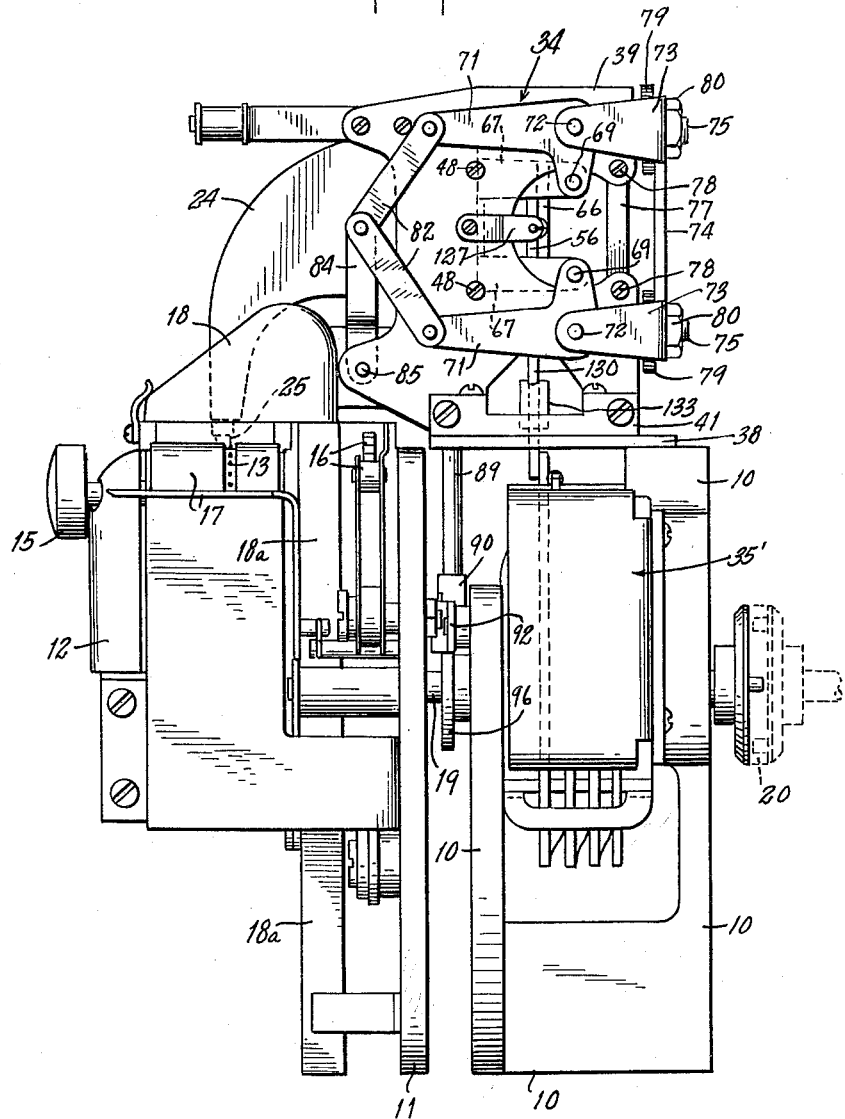
Figure 3:
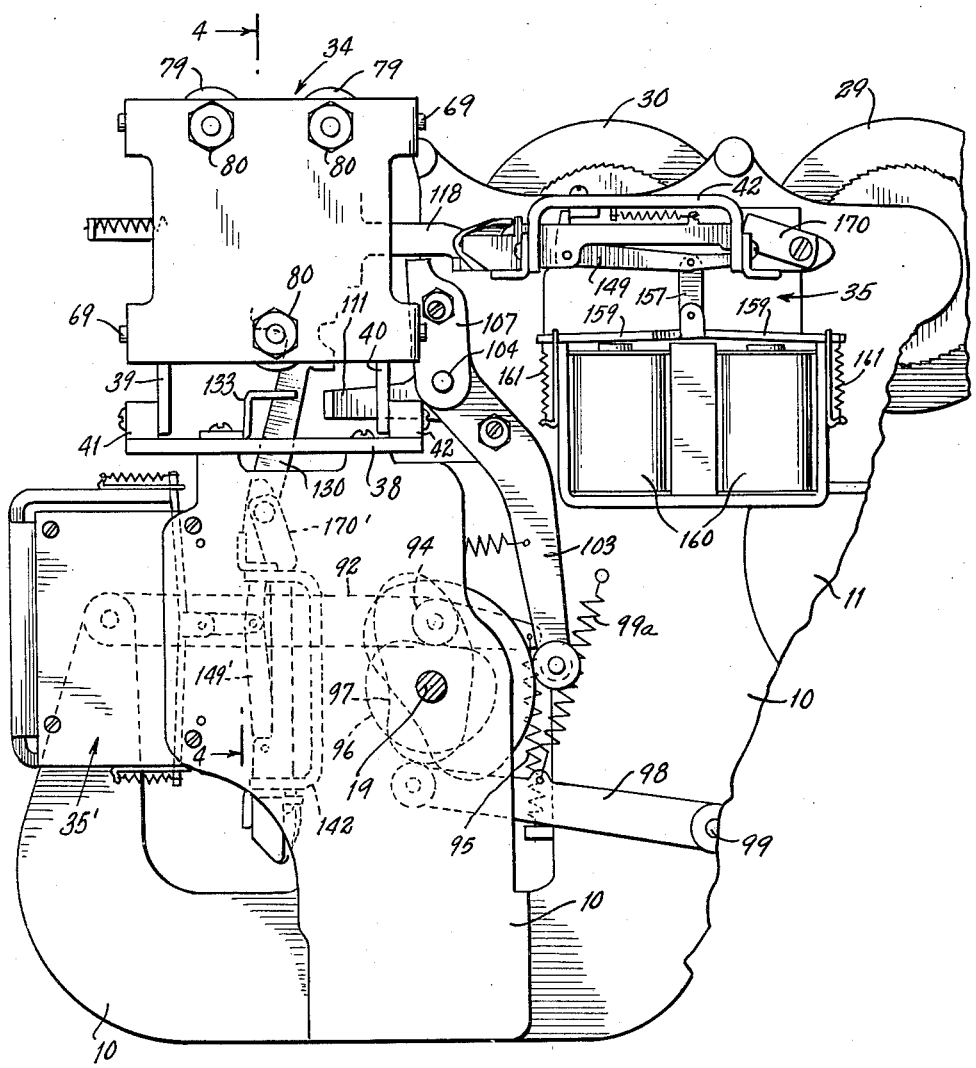

Referring now more particularly to FIGS. 1–3 of the drawings, a character wire printer embodying the present invention is conveniently constructed as an assembly fabricated upon a casting 10 affixed by machine screws (not shown) upon the back casting 11 of a unitary tape punch unit having the construction shown in FIGS. 8–12 of the United States Blodgett Patent No. 2,927,158. The printer casting 10 is precisely positioned on the back casting 11 of the tape punch by conventional use of locating pins, not shown.

As more fully shown and described in the Blodgett patent last mentioned, the tape punch also includes a front casting 12 fixedly secured in spaced relation to the back casting 11. The various components which make up the punch structure are supported on or between the back casting 11 and front casting 12, and briefly considered for purposes of the present description include a pin wheel 13 supported upon a shaft 14 and rotatable manually by a knob 15 or mechanically by a ratchet wheel and pawl 16 of which the pawl is reciprocated once during each punch cycle. A manually actuated hold down plate 17, pivotally supported upon the casting 11 permits tape to be manually placed in the punch and maintains the feed holes of the tape in engagement with the teeth of the pin wheel 13 to effect step by step movement of the tape past the punch die and punch pins positioned beneath a plastic housing 18 cooperating with a chute 18a to remove the punch chaff. The punch structure is mechanically driven through each of successive punch cycles by each complete rotation of a power shaft 19 connected through a flexible coupling 20 and a cycle control clutch (not shown) to an electric drive motor. The power shaft 19 is journalled in ball bearing raceways supported by the casting 10 of the wire printer assembly and by the front casting 12 of the punch assembly, and effects actuation of the punch pins under control of individual electromagnets supported within a frame 21 as more fully shown and described in the aforementioned Blodgett patent. Electrical connections to the electromagnets are effected through a plugboard 22 having paired receptacles in order that a common electrical connection may be made to an individual electromagnet within the frame 21 and to a corresponding individual electromagnet of the wire printer presently to be described.

The punch structure includes a top plate 23 over which the tape passes in its movement past the punch station. The printer includes a nose-shaped print wire guide 24 which has formed internally thereof a plurality of converging curvilinear channels through which individual ones of plural print wires are supported and guided into a cluster thereof at the print zone lying beneath the end 25 of the wire guide 24 which has a small spacing from a tape lying on the plate 23. As will presently be explained more fully, a ribbon impregnated with printing ink or other suitable print medium is guided by rolls 26, 27, and 28 between supply and take up reels 29 and 30 and moves between the ends of the print wires and the upper surface of a tape moved step by step over the top surface of the plate 23. Characters are thus printed by the print wires on the upper surface of the tape in spaced relation to the punching of a corresponding binary coded character at the punch station of the punch unit.

The wire printer assembly is essentially comprised by three principal subassemblies: a code plate retaining and actuating subassembly 34 which includes the print wire guide 24, a code translator subassembly 35 for horizontally positioning the code plate of the subassembly 34, and a code translator subassembly 35' similar in construction to the translator subassembly 35 and operating vertically to position the code plate of the assembly 34. These several subassemblies have constructions which will now be considered in turn beginning with that of the code plate retaining and actuating subassembly 34.

The code plate retaining and actuating subassembly 34 has the construction shown in FIGS. 4–6 which also show the power driven actuation of this subassembly. It is fabricated upon a base plate 38 which secures the subassembly to the printer casting 10 (see FIGS. 2 and 3) and supports side plates 39 and 40 (FIG. 3) by means of corner blocks 41 and 42 fastened by machine screws to both the base plate 38 and to respective ones of the side plates 39 and 40. The print wire guide 24 has flanges 43 which secure it to a mounting plate 44 by locating pins 45 and machine screws 46, and the plate 44 has threaded apertures 47 for fastening it between the side plates 39 and 40 by machine screws 48 (FIG. 2). As indicated more clearly in FIGS. 4 and 6, each of plural print wires 49 diverge from a cluster at the printing zone beneath the nose 25 of the guide 24 and extend through individual curvilinear channels in the latter to terminate in an actuating head 50. Each head 50 is guided by an individual aperture 51 in the mounting plate 44 and by an individual aperture 52 in a plate 53. The heads 50 have an integral radial flange 54 and an actuating pin 55. Each actuating head 50 is secured to an individual one of the print wires 49 and has a construction shown in FIG. 5 of the United States Patent No. 2,770,190; namely, the head has an internal annular bore to constitute a cylinder for a piston formed integral with the inner end of the pin 55, a helical spring being positioned within the cylinder between the piston and the end of the bore to provide spring pressure actuation of each print wire 49 after the latter is brought into pressure engagement with the printing ribbon earlier mentioned.

The head 50 is moved longitudinally whenever the pin 55 engages a character forming plateau provided on the surface of a code plate 56 of the type generally shown in the United States Johnson Patent No. 2,524,127. Such movement of the head 50 effects a corresponding longitudinal displacement of its associated printing wire 49 to effect a printing operation, and it is the purpose of the plate 53 to engage the collars 54 of the heads 50 at the conclusion of a character printing operation and restore the heads and associated printing wires to their non-printing positions in readiness for a further character printing operation. Each actuating head 50 projects freely through an aperture 57 provided in a plate 58 which is secured by locating pins 59 and machine screws (not shown) to the mounting plate 44 to retain the plate 53 movably positioned in assembled relation with the mounting plate 44. The code plate 56 includes upper and lower projections 61 which engage the ends of set screws 62 threaded through projections 63 on the plate 53 to space the code plate 56 from the pins 55 during times when the code plate 56 is moved laterally to horizontal and vertical character print selection positions prior to each character printing operation.

After the code plate 56 has been positioned horizontally and vertically as last mentioned, it is moved to a character printing position by actuation of a pressure plate 66. Upper and lower extending arms 67 on sides of the plate 53 and similar arms 68 of shorter length on the pressure plate 66 are apertured at their ends as shown to receive connecting pins 69 by which these plates are mechanically connected together and are movably supported on the ends of arms 70 of bell cranks 71. The latter are journalled by pairs on individual shafts 72 which extend between forwardly extending upper and lower arms 73 of a back plate 74. The latter is adjustably supported upon two upper studs 75 and a lower stud 76 carried by a supporting plate 77 secured by machine screws 78 (FIG. 2) upon locating pins (not shown) between the side plates 39 and 40 of the subassembly 34. The back plate 74 is adjustably secured in place on the studs 75 and 76 by means of knurled nuts 79 and lock nuts 80 threaded onto the studs. It will be apparent that this adjustable support of the back plate 74 from the supporting plate 77 adjusts the positioning of the shafts 72, thereby to adjust the extent and uniformity of pressure exerted by the pressure plate 66 upon the code plate 56 when the bell cranks 71 are rotated by link members 82 pivotally connected to the end of one arm of the bell cranks 71. The link members 82 are pivotally connected in pairs to an actuating yoke 84 which includes a shaft 85 journalled in the side plates 39 and 40 of the subassembly 34 and having a split head crank arm 86 clamped to the shaft 85 by machine screws 87. The end of the crank arm 86 is pivoted on a pin 88 carried by the end of an actuating rod 89 which terminates in a head 90 pivoted by a pin 91 to an arm 92. The latter is pivoted at one end on a stud shaft 93 provided on the casting 10, and carries near its other end a cam follower roller 94 which is biased by a spring 95 into engagement with a cam 96 pinned or otherwise affixed to the power drive shaft 19. A double-lobed load distributing cam 97 (FIG. 3) fixed to the shaft 19 is engaged by a cam follower 98 supported on a stud shaft 99 of the casting 10 and spring loaded by a spring 99a as shown, and serves to maintain a more uniform load on the drive shaft 19 with respect to its drive of the cam 96 and a reset cam presently to be described.

FIGS. 7–11 show the constructions of the code translator subassemblies 35 and 35'. It was earlier mentioned that the subassembly 35 positions the code plate horizontally, and that the subassembly 35' positions the code plate vertically. Each character, numeral or symbol to be printed is represented in a six level binary code form in conventional manner, and three code bits accordingly control the horizontal positioning of the code plate while the remaining three code bits control its vertical positioning. Three code bits are capable of selecting eight code plate positions, so that a total of sixty-four different character print selections by code plate positioning is readily effected by the six code bits available to represent characters, numerals and symbols.

The vertical code plate positioning translator subassembly 35' is, with certain minor differences hereinafter noted, essentially similar in construction and mode of operation to the horizontal code plate positioning translator subassembly 35. Accordingly, the following description of the construction and operation of the subassembly 35 will apply in large part to the subassembly 35'. Components of the subassembly 35' which correspond to the same components of the subassembly 35 are designated by the same reference numerals primed.

Figure 7:
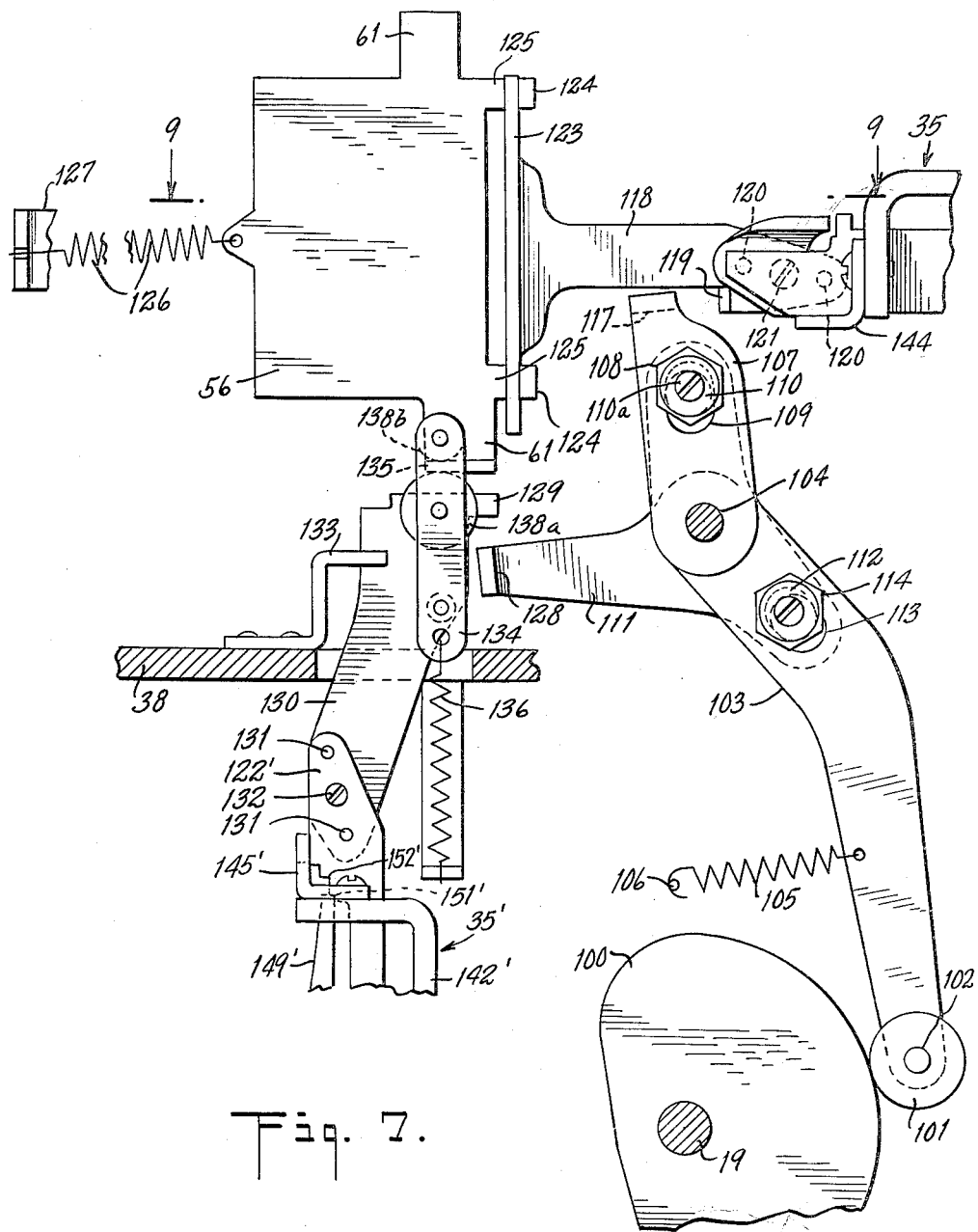
FIG. 7 illustrates a structure for initially resetting two code plate positioning subassemblies which operate to accomplish character print selection by selective positioning of the code plate in each of two directions.

Prior to each character printing operation, the horizontal and vertical code translator subassemblies 35 and 35' are reset by a cam reset structure shown in enlarged view in FIG. 7. This reset structure includes a cam 100 which is fixedly supported upon the power drive shaft 19 and is engaged by a cam follower roller 101 rotatably supported on a stud shaft 102 at the end of a reset lever 103 pivoted upon a stud shaft 104 carried by the casting 10. The cam follower roller 101 is biased into engagement with the cam 100 by a helical spring 105 which is connected between the lever 103 and a stud 106 carried by the casting 10. The reset lever 103 has a reset extension arm 107 rotatably supported on the stud shaft 104 but adjustably fastened to the upper end of the lever 103 by a hexagonal-head adjusting cam 108 having a cylindrical concentric body protruding into an elliptical slot 109 formed in the upper end of the extension arm 107 as indicated. The adjusted position of the cam 108 is secured by a clamping washer 110 which has a cylindrical body portion protruding into a concentric bore of the cam 108 and is eccentrically mounted upon, and clamped in rotatably adjusted position by, a machine screw 110a which engages a threaded aperture of the lever 103. The reset lever 103 also carries a reset extension arm 111 pivoted on the stud shaft 104 and likewise fastened to the lever 103 by an eccentrically supported cam 112 engaging an elliptical slot 113 provided in the lever 103 and secured in adjusted position by a lock screw 114.

The reset extension arm 107 has a turned over end portion 117 which engages a notch 119 provided on a yoke member 118 fastened by locating pins 120 and a machine screw 121 to one slide 122 (FIG. 9) of the code translator subassembly 35 presently to be described. The yoke member 118 has a flanged end 123 which, as shown more clearly in FIG. 8, engages turned over ends 124 of upper and lower projections 125 provided on one side of the code plate 56. The latter is biased by a helical spring 126, anchored to an arm 127 supported on the side plate 39 of the subassembly 34, to maintain firm engagement between the flanged end 123 of the yoke member 118 and the turned over ends 124 of the projections 125.

The reset extension arm 111 similarly is provided with a turned over end portion 128 which may move into engagement with a projection 129 formed on a member 130 secured by locating pins 131 and a machine screw 132 to one slide 122' of the code translator subassembly 35'. The member 131 is guided for reciprocal movement by a comb 133 (FIGS. 2 and 3) secured to the base plate 38 of the subassembly 34, and supports a fixed extension 134 having rollers 138a and 138b engaging opposite sides of a turned over end portion 135 of the lower projection 61 of the code plate 56. The member 130, and with it the code plate 56, are biased downwardly by a helical spring 136 anchored to an arm 137 (FIG. 4) secured to the base plate 38 of the subassembly 34.

It will be clear from the description of the reset structure just described that the reset lever 103 is rotated clockwise as shown in FIG. 7 when the cam follower roller 101 runs off the lobe of the cam 100. This clockwise rotation of the reset lever 103 causes the turned over end 117 of the reset extension arm 107 to engage the notch 119 of the yoke member 118 and move the code plate 56 to the right (as seen in FIG. 7) against the bias of the spring 126. At the same time, the turned over end portion 128 of the reset extension arm 111 engages the projection 129 of the member 130 and moves the code plate 56 vertically upward (as seen in FIG. 7) against the bias of the spring 136. Further rotation of the cam 100 rotates the reset lever 103 counterclockwise as seen in FIG. 7, and this permits the code plate 56 to move horizontally to the left and vertically downward to an extent controlled by the code translator subassemblies 35 and 35'. It may be noted in this respect that, as indicated more clearly in FIG. 8, the engagement of the flanged end 123 of the yoke member 118 with the turned over end portions 124 of the code plate projections 125 and the engagement of the turned over end portion 135 of the code plate extension 61 with the rollers 138a and 138b of the extension 134 fixed to the member 130 provide under bias of the springs 126 and 136 a continuous three point suspension of the code plate 56. This maintains accurate orientation of the code plate with respect to the fixed locations of the print wire actuator heads, thereby insuring accurate set up of the print wires to print each selected character.

The construction of the code translator subassembly 35 is shown in FIGS. 9 and 10 and includes the code translator slide 122 and three additional code translator slides 139, 140 and 141 which are guided for reciprocal movements by slots provided in the turned over ends of a comb plate 142. The code translator slides are maintained positioned in the slots of the comb plate 142 by brackets 143 and 144 secured by machine screws 145 to the ends of the comb plate 142 as shown. Each code slide is biased to the left, as seen in FIGS. 9 and 10 by a helical spring 146 extending between a projection 147 on the code slide and an anchor wire member 148 secured in an aperture of the comb plate 142. Each of the translator slides 139–141 has a latch member 149 pivoted thereto by a rivet 150, and each of the slides 122, 139 and 140 is provided with a dual step notch 151, 152 which is engaged by the end 153 of the latch member 149 of the next adjacent code slide (as shown more clearly in FIG. 9) for a purpose presently to be explained.

Each latch member 149 is mechanically connected by a pivoted link member 157 to a turned over projection 158 provided on the end of an armature 159 of a code translator electromagnet 160 individual to the latch member. A helical spring 161 normally biases each armature 159 to unattracted position, and the bias of the spring 161 is transmitted through the associated armature 159 and associated pivoted link member 157 to an individual one of the latch members 149 to maintain the end 153 of the latter biased for engagement with the notch 151 of the adjacent code slide. Upon energization of an electromagnet 160 and movement of its associated armature 159 to attracted position, the associated latch member 149 is positioned to engage its end 153 with the notch 152 of the adjacent code slide as shown more clearly in FIG. 10. It will be noted from FIG. 9 that the electromagnets and their armatures 159 are positioned in staggered relation for compactness of construction, that there is an electromagnet provided to actuate the latch member 149 of the code translating slides 139, 140 and 141, but that the translating slide 122 is not provided with a latch member nor actuating electromagnet.

Each of the code slides 122, 139 and 140 has a respective turned over end portion 162, 163 and 164 which engage a projection 165 of the next adjacent code slide as shown in FIG. 9. During the previously described reset operation of the code translator subassembly, the yoke member 118 moves its code slide 122 to the right as seen in FIG. 9, and the turned over end portion 162 of this slide engages the projection 165 on the code slide 139 to move this slide also to the right. In similar manner, the turned over end portion 163 of the slide 139 engages the projection 165 of the code slide 140 and concurrently moves the latter to the right, and the turned over end portion 164 of the slide 140 engages the projection 165 of the code slide 141 to move the latter to the right. Thus all of the code slides are concurrently moved to a reset position by the reset operation. As this occurs, an end portion 166 of each latch member 149 engages a fixed stop member 167 secured by machine screws 168 to the comb plate 142. After such engagement and upon further movement of the code slides to reset position, the latch members 149 are rotated counterclockwise as seen in FIG. 10 and through the pivoted links 157 forcibly move their associated armatures 159 to their unattracted positions to "knock" off the armatures and insure that they do not inadvertently remain in attracted position. Following the reset operation, the code translator subassembly 35 positions the code plate 56 according to the selective energizations of the associated electromagnets 160 in a manner presently to be explained.

The code translator subassembly 35' has the same essential construction and mode of operation as does the subassembly 35 just described except that the translator subassembly 35' is positioned and operated in reversed end for end relation with respect to that of the subassembly 35. This is indicated by the fragmentary view of the subassembly 35' shown in FIG. 7 where it will be noted that the notches 151' and 152' are on the end of the subassembly 35' facing the code plate 56 rather than on the end facing away from the code plate as shown for the subassembly 35 in FIG. 10.

The manner in which the code translator subassemblies 35 and 35' position the code plate 56 is illustrated schematically in FIG. 11. Consider first the operation of the code translator subassembly 35. The code slide 141 is provided with an adjustable stop member 170 pivoted to the slide and fixed in an adjusted angular position on the slide by a machine screw 172. The end of the stop member 170 engages the comb plate 142 and, by reason of its angular adjustment on the slide 141, provides an adjustable stop limiting movement of the slide 141 to the left as seen in FIG. 11. Assuming that none of the electromagnets associated with the several latch members 149 are energized, each latch member will engage the notch 151 of the next adjacent code slide upon completion of the reset operation earlier described. The slide 141 is spring biased to the left to engage its stop member 170 with the comb 142, and its latch member 149 holds the slide 140 in an initial position against the bias of its associated spring 146. The slide 140 with its latch 149 likewise holds the slide 139 in an initial position, and the slide 139 with its latch member 149 similarly holds the slide 122 in an initial position thereby to set the code plate 56 horizontally in a first print position established by the adjusted position of the stop member 170.

It will be noted that the length of the notches 152 differs as between the several code slides, so that energization of the electromagnet associated with the latch member 149 of the slide 141 to engage the latch member with the notch 152 of the slide 140 permits the latter to move a corresponding distance to the left under bias of its spring 146. This movement of the slide 140 and of its associated latch member 149 permits the code slide 139 to move an equal distance to the left under spring bias, and movement of the slide 139 permits through its latch member 149 a like movement of the code slide 122 to the left under bias of its spring 146. Accordingly such energization of the electromagnet associated with the latch member 149 of the code slide 141 enables the remaining code slides 122, 139 and 140 to move concurrently and position the code plate 56 in a second horizontal print position.

It will be evident that energization of the electromagnet associated with the latch member 149 of the code slide 140 permits concurrent movement of the code slides 122 and 139 by a distance corresponding to the length of the slot 152 of the code slide 139. Energization of the electromagnet associated with the latch member 149 of the code slide 139 permits the code slide 122 to move to the left a distance equal to the length of its slot 152.

Where any two electromagnets are concurrently energized, the amount which the code slide 122 moves to the left is determined by the sum of the lengths of the notches 152 affected by such concurrent electromagnet energizations. Thus it will be seen that combinational energizations of the electromagnets permits a total of seven selectable horizontal positions of the code plate 56 to be effected.

The operation of the code translator subassembly 35' in vertically positioning the code plate 56 is identical to that just described.

In brief summary of the overall operation of the wire printer structure above described, there is one cycle of operation of the tape punch for each revolution of the power shaft 19. Each revolution of the latter also causes an initial reset of the code translator subassemblies 35 and 35', and this reset operation is immediately followed by setting of the code plate 56 horizontally and vertically according to the combinational energizations of the translator electromagnets of the subassemblies 35 and 35'. Following each such setting of the code plate, the code plate actuating assembly 34 is cam driven as described in relation to FIGS. 4 and 5 and moves the code plate toward the pins 55 of the print wire heads 51. Those pins which engage a plateau on the code plate cause movement of their associated print wires into projecting relation beyond the end 25 of the print wire guide 24 to print on the tape a character, numeral or symbol corresponding to that punched in binary code form into the tape during the same cycle of punch operation. The print cycle terminates with the print wires withdrawn to their non-print position in readiness for a further character print operation.

The printing ribbon transport assembly has the construction shown in FIGS. 12–16 and is assembled on a casting 175 which is secured by machine screws and locating pins (neither shown) to the casting 10 of the wire printer. Each of the ribbon supply and take up reels 29 and 30 is removably supported by conventional spring detents (not shown) on stud shafts 176 journalled for rotation in the casting 175. The shafts 176 have integral reel support flanges 177 fixed to the shaft and carrying pins 178 for engagement in an aperture of the reels 29 and 30 for positive drive thereof by respective ratchet wheels 180 and 181 also fixed to the shafts 176. The printing ribbon 179 extends from the reel 29 over the guide pulleys 26 and 27 and then is guided beneath a guide plate 182 slotted at 183 to receive the end 25 of the print wire guide 24. The end 184 of the guide plate 182 is turned over and slotted to receive and guide the printing ribbon. The guide plate 182 is retained by a knurled and slotted thumb screw 185 on a bar 186 supported on the punch structure in spaced relation to the tape platform 23. The guide plate 182 has a handle 187 so that it may be manually grasped and removed to position the printing tape under it after which it is repositioned and fixed in place on the bar 186 by the thumb nut 185. The bar 186 also supports a guide plate 188, which is secured to the bar by machine screws 189 and serves in conjunction with the guide plate 182 to guide the printing ribbon from the printing zone beneath the end 25 of the wire guide 24 past the guide roller 28 on to the reel 30.

The printing ribbon is advanced step by step past the printing zone just preceding each printing operation. At the time the code translator subassemblies 35 and 35' are reset by the reset lever 103, the shaft 104 to which the reset lever is fixed rotates and moves a crank arm 191 which is also fixed to the shaft 104. The arm 191 has a pin 192 which engages slot 193 in a link member 194, a spring 195 extending between a pin 196 on the member 194 and a pin 197 on the casting 175 maintaining the pin 192 in contact with one end of the slot 193. The link member 194 is pivotally connected by a pin 198 to one arm of a bell crank 199 rotatably supported on a stud shaft 200 of the casting 175. The other arm of the bell crank 199 is connected through a pin 201 to a pawl 202 having a turned over end 203 bevelled to engage the teeth of either the ratchet wheel 181 or the ratchet wheel 180. An overcenter spring 204, having its ends anchored on a pin 205 of the casting 175 and on a pin 213 of the pawl 202, maintains the bevelled end 203 of the pawl 202 in engagement either with the ratchet wheel 181 or alternatively with the ratchet wheel 180. A detent pawl 206 is pivotally supported on a stud shaft 207 of the casting 175, has oppositely disposed side projections 208 and 209 turned over at their ends to anchor helical springs 210 and 211, and has an aperture 212 through which the pin 213 on the pawl 202 may extend to anchor the ends of both of the helical springs 210 and 211. The detent pawl 206 has a turned over end 216 bevelled to engage the teeth of either the ratchet wheel 181 or the ratchet wheel 180, and the interconnection by the springs 210 and 211 of the pawls 202 and 206 enables the overcenter spring 204 to maintain the bevelled ends of both pawls in engagement with the teeth of the ratchet wheel 181 or 180 while yet permitting relative longitudinal movement of the pawl 202 with respect to the pawl 206.

The printing ribbon 179 is provided with an eyelet 219 near each of its ends. As the ribbon becomes nearly exhausted on the reel 29 the eyelet 219 engages a pair of studs 220 and 221 provided on a lever 222 pivoted on a stud shaft 223 of the base casting 175. The next few feed steps of the ribbon 179 cause the eyelet 219 to move the lever 222 clockwise as seen in FIG. 12, the angular movement of the lever being eventually completed by an overcenter spring 224 having one end anchored on a pin 225 of the casting 175 and having its other end anchored on a pin 226 of the lever 222. The lever 222 also has a pair of studs 220' and 221' at its lower end for engagement with the eyelet (not shown) provided at the other end of the ribbon 179 to effect counterclockwise movement of the lever 222 when the ribbon, while feeding from the reel 30 to the reel 29, becomes nearly exhausted on the reel 30. These clockwise and counterclockwise movements of the lever 222 are limited by a stop pin 227 provided on the lever 222 and engaging a U-shaped stop bracket 228 secured to the base casting 175. A yoke 229 is pivotally secured by a pin 230 to the lever 222 and has a cylindrical end 231 bored and internally threaded to receive the threaded end of a link rod 232. The latter is provided with a flattened and hooked end portion which is pivotally anchored in an aperture 233 of an anvil 234 supported for reciprocatory movement in a groove 235 provided in a guide member 236 secured by machine screws 237 to a stud 238 on the base casting 175. The anvil 234 is retained in the groove 235 by a hold-down member 239 having a turned over end extending into a groove 240 of the anvil 234.

It will be apparent that angular movement of the lever 222 is transmitted by the link rod 232 to the anvil 234 to effect forward and backward motion of the latter. When the lever 222 moves clockwise and the anvil 234 is correspondingly moved to the left to the position shown in FIG. 14, a projection 241 provided on the side of the pawl 202 near its pivot 201 engages the upper surface 242 of the anvil upon completion of the feed stroke of the pawl 202. Continued counterclockwise drive of the bell crank 199 forces the pawl 202 to be moved counterclockwise about its pivot 201 and thereby effect engagement of its bevelled end 203 with the teeth of the ratchet wheel 180 as shown in FIG. 15. This angular movement of the pawl 202 is transmitted by the helical springs 210 and 211 to the detent pawl 206 to cause the latter also to move counterclockwise, whereby its bevelled end 216 also engages the teeth of the ratchet wheel 180 as shown in FIG. 15. The ribbon feed is thereupon changed from the ratchet wheel 181 to the ratchet wheel 180 and the ribbon 179 now feeds from the reel 30 to the reel 29. When the lever 222 is eventually moved counterclockwise by engagement of the ribbon eyelet with the studs 220' and 221' as previously explained, the anvil 234 is moved to the right as seen in FIGS. 12–15. Upon completion of the next feed stroke of the pawl 202, a projection 243 provided on the side of the feed pawl 202 opposite the projection 241 engages the upper surface 244 of the anvil 234. Further counterclockwise drive of the bell crank 199 forces the pawl 202 to move clockwise about its pivot 201, and this effects restoration of the pawls 202 and 206 to the positions shown in FIGS. 12 and 14 where their respective bevelled ends 203 and 216 engage the teeth of the ratchet wheel 181. The ribbon 179 now feeds from the supply reel 29 to the supply reel 30.

The term "character" is used in the foregoing description of the invention and in the claims in its generic connotation as meaning an alphabetic character, a numeral, or a symbol.

It will be apparent from the foregoing description of the invention that a character printer embodying the present invention involves a relatively simple yet sturdy and low cost construction having a minimized number of components of low mass and small range of movement, thus enabling the attainment of relatively high printing rates of successively printed characters. The selection of characters for printing under control of character-representative binary-form codes is accomplished by a printer structure possessing a consistently reliable character of operation which enables the attainment of high printing rates free of operational error. A character printer embodying the present invention has the further advantage that it enables character selection by use of a small, lightweight code plate positioned during operation by a positioning structure characterized by unusually high precision and rapidity of operation yet one requiring minimized service attention and adjustment over long periods of operation under severe service conditions.

While a specific form of the invention has been described for purposes of illustration, it is contemplated that numerous changes may be made without departing from the spirit of the invention.

What is claimed is:

1. A character wire printer comprising, a wire printer structure adapted to receive successively presented character-representative codes and including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural code-translating slide members having latch members for mechanically and code-selectably intercoupling said members by individual pairs in each group to adjust said code plate in said two directions, and means responsive to each of said successively presented character-representative codes for selectably controlling the latch member of each of said pairs of slide members and thereby the adjustment of said code plate by incremental steps in said two directions to code selectable ones of said multiple character print-wire set-up positions thereof.

2. A character wire printer comprising, a wire printer structure including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural longitudinally movable code-translating slide members for controlling the position of said code plate in individual ones of said two directions and having latch members for mechanically and code-selectably intercoupling said slide members by individual pairs in each group to effect cumulative serial longitudinal movement of the slide members within a group and thereby adjust said code plate in each of said two directions, means for selectively controlling said latch members according to a selected character to be printed, and means operating upon completion of each positioning of said character-print selection means for actuating said character-print selection means through a cyclic printing motion to effect printing of a selected character.

3. A character wire printer comprising, a wire printer structure including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural longitudinally movable code-translating slide members for adjusting said code plate in individual ones of said two directions, a latch member individual to each of plural successive pairs of said slide members within each said group thereof and selectably controllable to establish two values of relative longitudinal displacement of the slide members of each pair thereof, means for selectively controlling said latch members according to a selected character to be printed, and means operating upon completion of each positioning of said character-print selection means for actuating said character-print selection means through a cyclic printing motion to effect printing of a selected character.

4. A character wire printer comprising, a wire printer structure including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural longitudinally movable code-translating slide members mechanically serially intercoupled in each group to move in one direction to a common reset position and mechanically code-selectably serially intercoupled in each group to move in opposite direction, means responsive to the cumulative movements of said groups of slide members for adjusting said code plate in individual ones of said two directions, and means responsive to each of successively presented character-representative coded actuations for moving said slide members to said reset position thereof and for thereafter controlling the selective mechanical intercoupling of the slide members in both of said groups to adjust said code plate in said two directions to code selectable ones of said multiple character print-wire set-up positions thereof.

5. A character wire printer comprising, a wire printer structure including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural longitudinally movable code translating slide members arranged in given order in each group and having fixed abutments extending from one slide member into engageable contact with an adjacent slide member arranged in said order to effect serial mechanical intercoupling thereof in each group for movement in one direction to a common reset position, a latch member extending from one slide member selectably to engage either of two latch notches of an adjacent slide member arranged in reverse order to said given order to effect latch controllable mechanical interconnection of the slide members of each group for movement in a direction opposite to said one direction, means responsive to the cumulative movements of the slide members in each said group thereof for adjusting said code plate in individual ones of said two directions, and means responsive to each of successively presented character-representative coded actuations for moving said slide members to said reset position thereof and for thereafter controlling said latch members in both of said groups to adjust said code plate in said two directions to code selectable ones of said multiple character print-wire set-up positions thereof.

6. A character wire printer comprising, a plurality of print wires supported in a converging cluster thereof and individually movable longitudinally between printing and non-printing positions, a code plate movable laterally in two mutually perpendicular directions and by incremental steps establishing multiple character print-wire set-up positions, a plurality of code translating slide members each latchable in two longitudinal positions and operationally intercoupled in two groups thereof, means actuated during a character-print operation for initially concurrently setting said groups of said slide members to a first said latchable position thereof corresponding to an initial character-print positioning of said code plate in said two directions and responsive to subsequent actuation by a character-representative code for selectively controlling the individual latching of said slide members in said first positions thereof to effect by slide-member group control incremental step positioning of said code plate in individual ones of said two directions, and means effective upon each completion of said selection positioning of said code plate for reciprocating said code plate into and out of engageable position with one end of said print wires to effect longitudinal movement of selected print wires to character print position and return thereof to non-print position.

7. A character wire printer comprising, a plurality of print wires supported in a converging cluster thereof and individually movable longitudinally between printing and non-printing positions, a code plate movable laterally in two mutually perpendicular directions and by incremental steps establishing multiple character print-wire set-up positions, a plurality of code translating slide members each latchable in two longitudinal positions and operationally intercoupled in two groups thereof, power-driven cam-actuated means operative during each of successive character-print operations for initially concurrently setting said groups of said slide members to move said code plate to an initial position in said two directions and responsive to subsequent actuation by a character-representative code for selectively controlling the individual latching of said slide members to effect by slide-member group cumulative control and by differing increments of step movement the positioning of said code plate in individual ones of said two directions, and power-driven cam-actuated means effective upon each completion of said selection positioning of said code plate for reciprocating said code plate into and out of engageable position with one end of said print wires to effect longitudinal movement of selected print wires to character print position and return thereof to non-print position.

8. A character wire printer comprising, a plurality of print wires supported in a converging cluster thereof and individually movable longitudinally between printing and non-printing positions, two groups of plural code translating slide members having in each group serial mechanical intercoupling in preselected order from a first to a last thereof to attain a common relative reset position of all thereof upon movement of said one slide member in a reset direction to said reset position, electromagnetic latch control means selectably intercoupling the slide members in each group in reverse order to said preselected order and responsive to a character-representative code to establish between adjacent slide members in said reverse order either of two relative post-reset longitudinal displacements thereof in a direction opposite to said reset direction, a code plate responsive to the positioning in each said direction of said one slide member in both said groups for moving a corresponding amount of individual ones of two mutually perpendicular directions to establish any of multiple character print-wire set-up positions, means for moving said one slide member in both said groups to said reset positions thereof and for thereafter permitting movement of said one slide member in said opposite direction to positions established by group control of said slide members by said electromagnetic latch control means, and means effective upon completion of positioning of said slide members by said last mentioned means for reciprocating said code plate into and out of engageable position with one end of said print wires to effect longitudinal movement of selected print wires to character print position and return thereof to non-print position.

9. A character wire printer comprising, a plurality of print wires, means for supporting said wires in a converging cluster thereof while permitting longitudinal movement of each between printing and non-printing positions, a code plate movable by incremental steps laterally in two mutually perpendicular directions to multiple character print-wire set-up positions, two groups of code translating slide members each latchable in two longitudinal positions to effect by group control differing increments of step movement of said code plate in individual ones of said two directions, means responsive to character-representative code actuation for selectively controlling the latching of said slide members by groups thereof, means for concurrently actuating each group of said slide members to position said code plate in an initial position in said two directions and for then permitting coded-character selection positioning of said code plate in said two directions by said latch control means, and means effective upon completion of said selection positioning of said code plate for moving said code plate into and out of engageable position with one end of said print wires to effect longitudinal movement of selected print wires to character print position and return thereof to non-print position.

10. A character printer comprising a printer structure adapted to receive character-representative coded control actuations and including means adjustable laterally in two mutually perpendicular directions and by incremental steps for providing by reason of multiple positioning of said means in each of said two directions selection of any of multiple characters to be printed, two groups of plural code-translating slide members having with respect to each of individual pairs in each group code-selectable mechanical intercoupling means, means coupling said groups of slide members to said character-print selection means to move and control by individual groups the positioning of said selection means in individual ones of said two directions, means responsive to said character-representative coded control actuations for controlling said intercoupling means to control said selective positioning of said selection means in said two directions, and means operating upon completion of each positioning of said character-print selection means for actuating said printer structure through a cycle of printing operation to effect printing of a selected character.

11. A character printer comprising a printer structure adapted to receive character-representative coded control actuations and including means adjustable laterally in two mutually perpendicular directions and by incremental steps for providing by reason of multiple positioning of said means in each of said two directions selection of any of multiple characters to be printed, two groups of plural code-translating slide members having with respect to each of individual pairs in each group code-selectable mechanical-latch intercoupling means, means coupling said groups of slide members to said character-print selection means to move and control by individual groups the positioning of said selection means in individual ones of said two directions, means responsive to each of said character-representative coded control actuations for controlling individually and in combination said latch intercoupling means to control said selective positioning of said selection means in said two directions, and means operating upon completion of each positioning of said character-print selection means for actuating said printer structure through a cycle of printing operation to effect printing of a selected character.

12. A character printer comprising a printer structure adapted to receive character-representative coded control actuations and including means adjustable laterally in two mutually perpendicular directions and by incremental steps for providing by reason of multiple positioning of said means in each of said two directions selection of any of multiple characters to be printed, two groups of plural longitudinally movable code-translating slide members having with respect to each of individual pairs in each group code-selectable mechanical intercoupling latch members controlling the cumulative series longitudinal movement of the slide members within a group, means coupling said groups of slide members to said character-print selection means and responsive to said character-representative coded control actuations for controlling said latch members to control said selective positioning of said selection means in said two directions, and means operating upon completion of each positioning of said character-print selection means for actuating said printer structure through a cycle of printing operation to effect printing of a selected character.

13. A character printer comprising a printer structure adapted to receive character-representative coded control actuations and including means adjustable laterally in two mutually perpendicular directions and by incremental steps for providing by reason of multiple positioning of said means in each of said two directions selection of any of multiple characters to be printed, two groups of plural longitudinally movable code-translating slide members, a latch member individual to each of plural successive pairs of said slide members within each said group thereof and selectably controllable to establish either of two values of relative longitudinal displacement of the slide members of said each pair, means coupling said groups of slide members to said character-print selection means and responsive to said character-representative coded control actuations for selectably controlling said latch members to control said selective positioning of said selection means in said two directions, and means operating upon completion of each positioning of said character-print selection means for actuating said printer structure through a cycle of printing operation to effect printing of a selected character.

14. A character printer comprising a printer structure adapted to receive character-representative coded control actuations and including means adjustable laterally in two mutually perpendicular directions and by incremental steps for providing by reason of multiple positioning of said means in each of said two directions selection of any of multiple characters to be printed, two groups of plural longitudinally movable code-translating slide members arranged in given order in each group and having fixed abutments extending from one slide member into engageable contact with an adjacent slide member arranged in said order to effect serial mechanical intercoupling thereof in each group for movement in one direction to a common reset position, a latch member individual to each of plural successive pairs of said slide members arranged in reverse order to said given order within each said group thereof and selectably controllable to establish for movement of said slide members in opposite direction either of two values of relative longitudinal displacement of the slide members of said each pair, means coupling said groups of slide members to said character-print selection means and responsive to said character-representative coded control actuations for selectably controlling said latch members to control said selective positioning of said selection means in said two directions, and means operating upon completion of each positioning of said character-print selection means for actuating said printer structure through a cycle of printing operation to effect printing of a selected character.

15. A character printer comprising a printer structure adapted to receive character-representative coded control actuations and including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural code-translating slide members having with respect to each of individual pairs in each group code-selectable mechanical intercoupling means, means coupling said groups of slide members to said code plate to move and control by individual groups the positioning of said code plate in individual ones of said two directions, and means responsive to said character-representative coded control actuations for controlling said intercoupling means to control said selective set-up positioning of said code plate in said two directions.

16. A character printer comprising a printer structure adapted to receive character-representative coded control actuations and including a plurality of print wires converging to a character-print cluster at one end and actuated to print position upon engagement of their other end by a character-print code plate adjustable laterally in two mutually perpendicular directions and by incremental steps establishing multiple character print-wire set-up positions, two groups of plural longitudinally movable code-translating slide members, a latch member individual to each of plural successive pairs of said slide members within each said group thereof and selectably controllable to establish either of two values of relative longitudinal displacement of the slide members of said each pair, and means for moving said code plate in said two directions by movement imparted thereto through said groups of slide members and responsive to each of said character-representative coded control actuations for selectably controlling said latch members to control each said selective set-up positioning of said code plate in said two directions.

17. A character printer comprising a printer structure adapted to receive character-representative coded control actuations and including a plurality of print wires converging to a character-print cluster at one end and actuated to print position upon engagement of their other end by a character-print code plate adjustably laterally in two mutually perpendicular directions and by incremental steps establishing multiple character print-wire set-up positions, two groups of plural longitudinally movable code-translating slide members having by successive pairs in each group fixed relative slide displacements for movement in one direction to a reset position, a latch member individual to each of other plural successive pairs of said slide members within each said group thereof and selectably controllable to establish for movement of said slide members in opposite direction either of two values of relative longitudinal displacement of the slide members of said each other pair, and means including mechanical coupling of said groups of slide members to said code plate for moving said slide members of each said group and thereby said code plate in said two directions and responsive to said character-representative coded control actuations for selectably controlling said latch members to control said selective set-up positioning of said code plate in said two directions thereof.

18. A character printer comprising a printer structure adapted to receive character-representative coded control electrical signals and including means adjustable laterally in two mutually perpendicular directions and by incremental steps for providing by reason of multiple positioning of said means in each of said two directions selection of any of multiple characters to be printed, two groups of plural code-translating slide members having with respect to each of individual pairs in each group fixed mechanical intercoupling means and having with respect to each of other individual pairs in each group code-selectable mechanical intercoupling means, means coupling said groups of slide members to said character-print selection means to move and control by individual groups the positioning of said selection means in individual ones of said two directions, a plurality of electromagnets responsive to said character-representative coded control signals for controlling said intercoupling means to control said selective positioning of said selection means in said two directions, and means operating upon completion of each positioning of said character-print selection means for actuating said printer structure through a cycle of printing operation to effect printing of a selected character.

References Cited in the file of this patent

UNITED STATES PATENTS

| | | |
|---|---|---|
| 2,524,127 | Johnson | Oct. 3, 1950 |
| 2,669,178 | Crowell | Feb. 16, 1954 |
| 2,720,164 | Braun et al. | Oct. 11, 1955 |
| 2,730,040 | Johnson | Jan. 10, 1956 |
| 2,749,839 | Crowell et al. | June 12, 1956 |
| 2,757,604 | Von Glahn | Aug. 7, 1956 |
| 2,785,627 | Johnson | Mar. 19, 1957 |
| 2,881,697 | Kistner et al. | Apr. 14, 1959 |